(12) United States Patent
Aoyama

(10) Patent No.: US 6,829,735 B1
(45) Date of Patent: Dec. 7, 2004

(54) COMPUTER SYSTEM HAVING A ROM CORRECTION UNIT

(75) Inventor: Haruko Aoyama, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 622 days.

(21) Appl. No.: 09/589,435

(22) Filed: Jun. 7, 2000

(30) Foreign Application Priority Data

Jun. 8, 1999  (JP) ........................................ 11-161601

(51) Int. Cl.[7] .............................................. G06F 11/00
(52) U.S. Cl. ........................................... 714/53; 714/8
(58) Field of Search ............................... 714/53, 8, 49; 712/227, 234

(56) References Cited

U.S. PATENT DOCUMENTS

| | | | | |
|---|---|---|---|---|
| 5,726,641 A | * | 3/1998 | Ide | .......................... 340/825.22 |
| 5,799,144 A | | 8/1998 | Mio | |

FOREIGN PATENT DOCUMENTS

| | | | | |
|---|---|---|---|---|
| EP | 0640916 | 3/1995 | | |
| JP | 358016350 A | * | 1/1983 | ............. G06F/9/22 |
| JP | 402165342 A | * | 6/1990 | ........... G06F/11/00 |
| JP | 6-318260 | 11/1994 | | |
| JP | 8-95946 | 4/1996 | | |
| JP | 8095946 | 4/1996 | | |
| JP | 8-185319 | 7/1996 | | |
| JP | 9-198245 | 7/1997 | | |
| JP | 9-319569 | 12/1997 | | |

OTHER PUBLICATIONS

Japanese Office Action dated Nov. 2, 2001 (w/ English translation of relevant portion).

* cited by examiner

*Primary Examiner*—Scott Baderman
(74) *Attorney, Agent, or Firm*—Dickstein, Shapiro, Morin & Oshinsky, LLP.

(57) ABSTRACT

Each of a plurality of ROM correction units in a computer system includes a register for storing a subject address of an original instruction group having a bug, a comparator for comparing a current address against the subject address, a selector for selecting the current address or the branch address of a modified instruction group based on the result of the comparison by the comparator, and a flag generator for setting a correction flag when the selector selects the branch address. The computer system recognizes the order of the plurality of ROM correction units based on the correction flag. A plurality of bugs in a program can be modified by respective ROM correction units.

3 Claims, 11 Drawing Sheets

FIG. 6

ROM 53

| ADDRESS | INSTRUCTION | |
|---|---|---|
| a-1 | P | |
| a | Q | |
| a+1 | R | SUBJECT ADDRESS |
| a+2 | S | |
| a+3 | T | |
| a+4 | U | |
| ∫ | ∫ | |
| a+10 | Z | RETURN ADDRESS |
| ∫ | ∫ | |

FIG. 7

RAM 60

| ADDRESS | INSTRUCTION | |
|---|---|---|
| b | H | BRANCH ADDRESS |
| b+1 | I | |
| b+2 | J | |
| b+3 | K | |
| ∫ | ∫ | |
| b+5 | M | RETURN |

FIG. 8

| SYSTEM CLOCK | ADDRESS BUS | PC REGISTER | IF/ID REGISTER | ID/EX REGISTER | ADDER 16 OUTPUT | ADDEND 24 |
|---|---|---|---|---|---|---|
| T2 | a+1 | a | a-1 | a-2 | a-2 | 0 |
| T3 | a+2 | a+1 | a | a-1 | a-1 | 0 |
| T4 | a+3 | a+2 | a+1 | a | a | 0 |
| T5 | b | a+3 | a+2 | a+1 | b | b-a-1 |
| T6 | b+1 | b | a+3 | a+2 | a+2 | 0 |
| T7 | b+2 | b+1 | b | a+3 | a+3 | 0 |
| | | ADDRESS ON IF STAGE | ADDRESS ON ID STAGE | ADDRESS ON EX STAGE | DIFFERENCE | |

FIG. 10

| ADDRESS | INSTRUCTION | |
|---|---|---|
| a−1 | P | |
| a | X"JMP" | |
| a+1 | R | SUBJECT ADDRESS |
| a+2 | S | |
| a+3 | T | |
| a+4 | U | |
| ⁓ | ⁓ | |
| a+10 | Z | RETURN ADDRESS |
| ⁓ | ⁓ | |

FIG. 11

| ADDRESS | INSTRUCTION | |
|---|---|---|
| b | H | BRANCH ADDRESS |
| b+1 | I | |
| b+2 | J | |
| b+3 | K | |
| ⁓ | ⁓ | |
| b+5 | M | RETURN |

FIG. 12

| SYSTEM CLOCK | ADDRESS BUS | PC REGISTER | IF/ID REGISTER | ID/EX REGISTER | ADDER 16 | |
|---|---|---|---|---|---|---|
| | | | | | OUTPUT | ADDEND 24 |
| T2 | a+1 | a | a-1 | a-2 | a-2 | 0 |
| T3 | a+2 | a+1 | a | a-1 | a-1 | 0 |
| T4 | b | a+2 | a+1 | a | b | b-a |
| T5 | b+1 | b | a+2 | a+1 | a+1 | 0 |
| T6 | b+2 | b+1 | b | a+2 | a+2 | 0 |
| T7 | b+3 | b+2 | b+1 | b | b | 0 |
| | | ADDRESS ON IF STAGE | ADDRESS ON ID STAGE | ADDRESS ON EX STAGE | | DIFFERENCE | ized by the comparator, and a flag generator for
COMPUTER SYSTEM HAVING A ROM CORRECTION UNIT

BACKGROUND OF THE INVENTION (a) Field of the Invention

The present invention relates to a computer system having a ROM correction unit and, more particularly, to a ROM correction unit for use in a computer system operating with a pipe-line processing based on a program stored in a ROM.

(b) Description of the Related Art

Single-chip microcomputer systems running on programs stored in mask ROMs are increasingly used for a variety of applications. In the single-chip microcomputer system, even if a bug is found in the program stored in the mask ROM, the bug cannot be eliminated from the then-existing microcomputer system. Thus, a ROM correction technique is proposed wherein the original instruction group in a program having a bug therein is replaced by a modified instruction group free from the bug. The replacement of the instruction group is generally conducted at the stage when the CPU finds the top address (or subject address) of the original instruction group to be replaced with the modified instruction group.

Patent Publication JP-A-8-95946 describes a microcomputer system having a ROM correction function, such as shown in FIG. 1. The microcomputer system 93 includes a pipe-line processing CPU 87 having an instruction queue therein, a register 86 for storing the subject address of the original instruction group in the program having a bug therein, a RAM 84 for storing a top address (or branch address) of a modified instruction group, a fetch pointer 81 for counting and indicating the current address of the instruction to be fetched by the instruction queue, a comparator 85 for comparing the address in the fetch pointer 81 against the subject address stored in the register 86 to deliver a coincidence signal (selection signal) 92, a branch-instruction output unit 89 for delivering a branch instruction signal for indicating a jump to the branch address of the modified instruction group, and a selector 88 for selecting the current address for the ROM 83 or the branch instruction signal supplied from the branch-instruction output unit 89 based on the coincidence signal.

The selector 88 delivers the branch instruction signal to the CPU 87 at the stage of the fetch of the address if the comparator 85 finds a coincidence therein. Thus, the CPU 87 bypasses the original instruction group having the bug and operates instead on the modified instruction group supplied from the RAM 84.

In the proposed ROM correction technique, the subject address of the original instruction group having a bug therein is set in the register 86 before the CPU 87 operates on the program.

If a plurality of bugs are found in the separate portions of the program stored in the mask ROM 83, the ROM correction technique must indicate the priority order among the plurality of subject addresses, and the CPU 87 must correctly judge the priority order, which requires a complicated procedure however.

SUMMARY OF THE INVENTION

In view of the above, it is an object of the present invention to provide a computer system having a ROM correction unit therein and operating with pipe-line processing, which is capable of correctly recognizing operation of the ROM correction unit and thus recognize the priority order if a plurality of ROM correction units are provided in the computer system.

The present invention provides a computer system including a CPU for operating with pipe-line processing, a ROM storing a program to be executed by the CPU, and at least one ROM correction unit including a first storage unit for storing a subject address of an original instruction group in the program having a bug therein, a second storage unit for storing a modified instruction group for replacing the original instruction group by the modified instruction group having a branch address, a comparator for comparing a current address of a current instruction read from the ROM against the subject address, a selector for selecting the current address or the branch address based on a result of the comparison by the comparator, and a flag generator for setting a ROM correction flag when the selector selects the branch address.

In accordance with the computer system of the present invention, since the flag generator of the ROM correction unit informs the CPU the operation of the ROM correction unit, the CPU correctly recognizes operation of the ROM correction unit. Thus, if a plurality of ROM correction units are provided in the computer system, the CPU correctly recognizes the priority order of the ROM correction units, whereby a plurality of original instruction groups in a program stored in a ROM can be replaced by respective modified instruction groups.

The above and other objects, features and advantages of the present invention will be more apparent from the following description, referring to the accompanying drawings.

BRIEF DESCRIPTION OF THE DRAWINGS

FIG. 6 shows a program stored in the ROM shown in FIG. 2.

FIG. 7 shows a modified instruction group stored in the RAM used for the computer system of FIG. 2.

FIG. 8 is a table for showing calculation of the current address in the computer system of FIG. 2.

FIG. 10 shows a program stored in the ROM shown in FIG. 2 for the another portion of FIG. 9.

FIG. 11 shows an instruction group stored in the RAM used for the computer system of FIG. 2 for the another portion of FIG. 9.

FIG. 12 is a table for showing calculation of the current address in the computer system of FIG. 2 for the another portion of FIG. 9.

PREFERRED EMBODIMENT OF THE INVENTION

Figure 1:
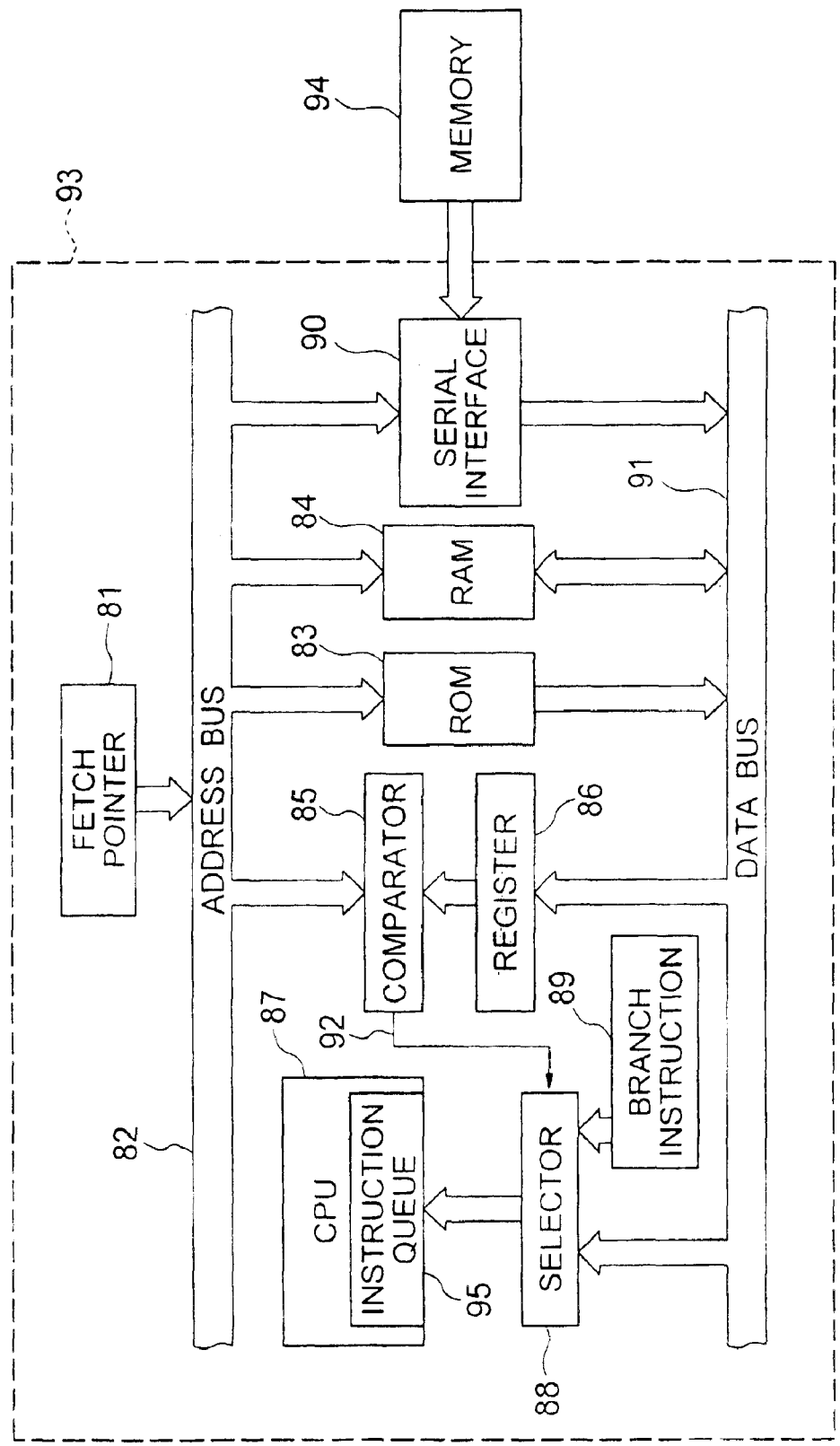
FIG. 1 is a conventional microcomputer system having a ROM correction function.

Now, the present invention is more specifically described with reference to accompanying drawings, wherein similar constituent elements are designated by related reference numerals.

Figure 2:
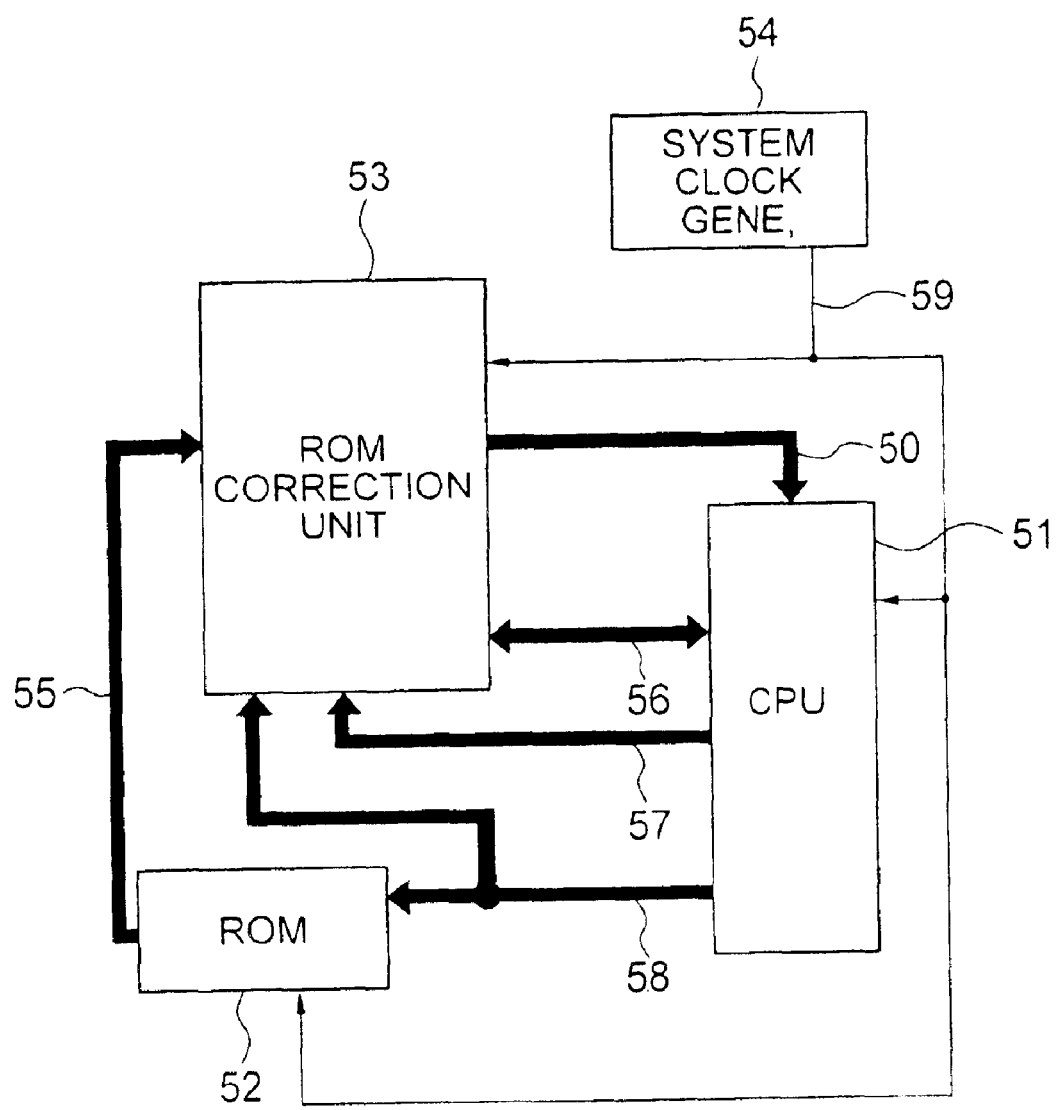
FIG. 2 is a computer system having a ROM correction unit according to a first embodiment of the present invention.

Referring to FIG. 2, a computer system according to a first embodiment of the present invention includes a CPU 51 for operating with pipe-line processing, a ROM 52 storing a program for the CPU 51, a ROM correction unit 53 having a ROM correction function, a system clock generator 54 for generating a system clock, a plurality of buses 56 to 58 and a system clock line 59.

The computer system is implemented as a microcomputer system formed on a single chip IC. Although a single ROM correction unit 53 is depicted in FIG. 2, a plurality of ROM correction units 53 are provided in the computer system. The CPU 51 selects one of the ROM correction units 53 based on the current address of the instruction to be fetched. The microcomputer system further includes a RAM and a set of external interfaces (not shown) such as for receiving modified instruction groups.

The pipe-line processing has a plurality (five in this case) of processing stages for each instruction, including an instruction fetch (IF) stage, wherein an instruction is read from the ROM, an instruction decode (ID) stage wherein the code of the instruction is decoded to read the data stored in the internal register of the CPU, an execution (EX) stage wherein the instruction is executed, a memory write-in (MEM) stage wherein the CPU 51 writes the data obtained by the execution into the memory cell, and a write back (WB) stage wherein the CPU 51 updates the previous data with the result of the execution. In this pipe-line processing, the CPU 51 can execute a plurality of instructions in parallel.

The CPU 51, ROM 52 and ROM correction unit 53 operate on the system clock supplied from the system clock generator 54 through the clock signal line 59. The CPU 51 calculates the address of each instruction for the pipe-line processing. The CPU 51 delivers the address of the instruction assigned for the IF stage to the ROM 52 and the ROM correction unit 53 through the address bus 58, and delivers the address of the instruction assigned for the EX stage to the ROM correction unit 53 through the PCEX stage bus 57.

The ROM 52 delivers the instruction specified by the current address to the ROM correction unit 53 through the data bus 55. The ROM correction unit 53 delivers either the instruction supplied through the data bus 55 or the instruction selected by the ROM correction function, through the data bus 50 to the CPU 51.

Figure 3:
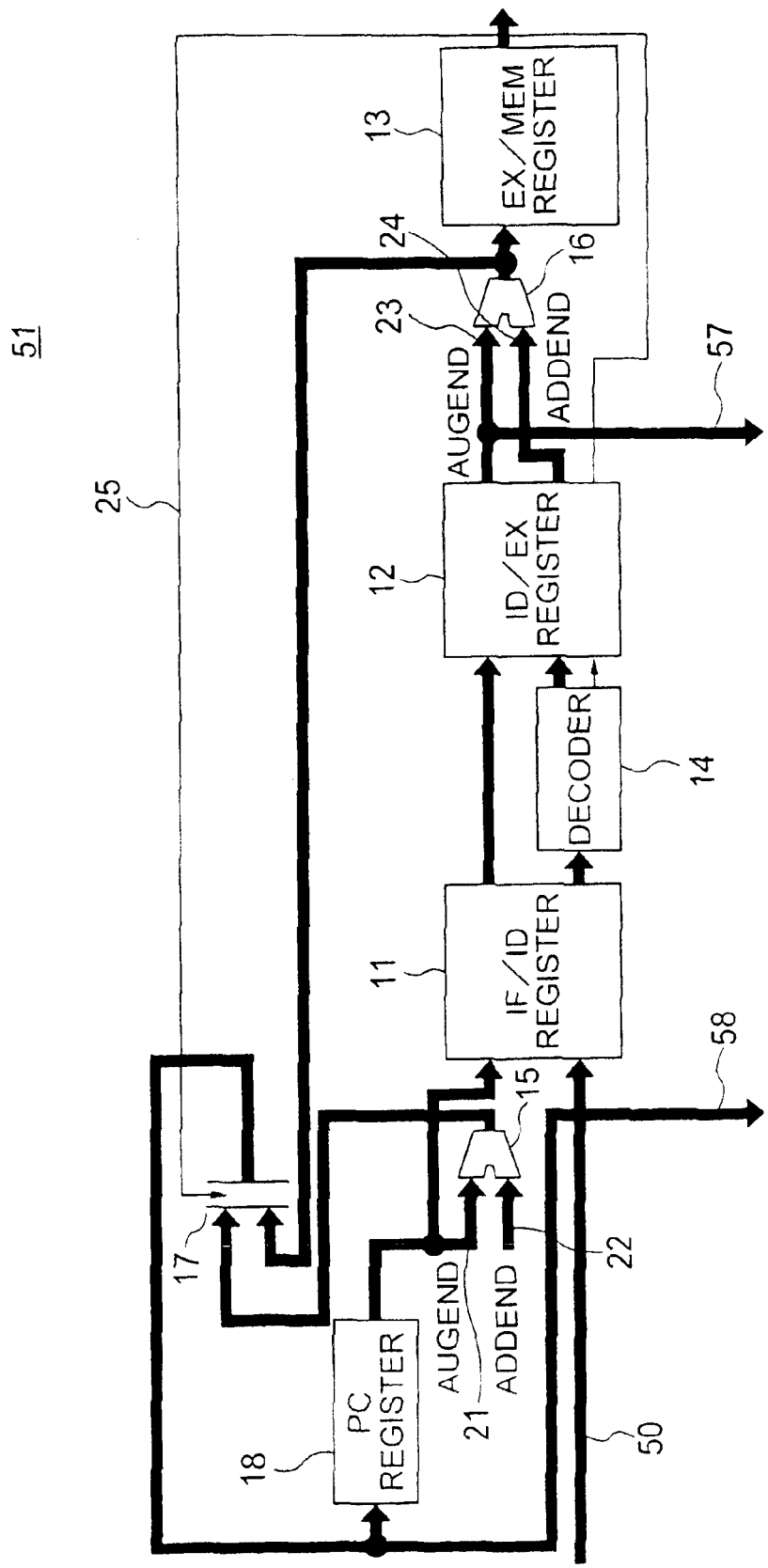
FIG. 3 is an exemplified configuration of the CPU shown in FIG. 2.

Referring to FIG. 3 showing an exemplified configuration of the CPU 51, the CPU 51 includes a PC register 18 acting as a program counter, an IF/ID register 11 for storing the address and the code of the instruction staying at the ID stage, an ID/EX register for storing the address of the instruction, the addend and the selection signal, an EX/MEM register for storing the address of the instruction staying at the MEM stage, a decoder 14 for decoding the code of the instruction supplied on the data bus 50, a first adder 15 for counting the program count, a second adder 16 for calculating the branch address, a selector 17 for selecting one of the addresses delivered from the adders 15 and 16 to supply the selected address to the program counter or PC register 18.

The PC register 18 stores the address of the instruction staying at the IF stage as a program count, and delivers the program count to the first adder 15 as an augend and to the IF/ID register 11 for storage thereof. The first adder 15 adds "1" as an addend 22 to the augend 21, and delivers the sum to the selector 17. The selector 17 selects the sum output from the first adder 15 and delivers the same to the address bus 58 and the PC register 18 if the ID/EX register 12 does not output a selection signal 25. The PC register 18 counts up the program count by update of the current count by the output from the first adder 15.

The IF/ID register 11 stores the instruction address supplied from the PC register 18 and the instruction code supplied through the data bus 10. The IF/ID register 11 delivers the instruction address stored therein to the ID/EX register 12 and also delivers the instruction code stored therein to the decoder 14. The decoder 14 decodes the instruction code to deliver a specific output based on the result of the decoding and a selection signal 25 to the ID/EX register 12. MOre specifically, the decoder 14 delivers "0" if the decoded instruction is not a branch instruction and delivers the difference between the address of the branch instruction and the address of the instruction staying at the EX stage.

ID/EX register 12 delivers the instruction address stored therein to the second adder 16 as an augend 23, delivers the specific output supplied from the decoder 14 to the second adder 16 as an addend 24, and delivers a selection signal 25, if any, to the selector 17. The second adder 16 adds the addend 24 to the augend 23 to deliver the sum thereof to the EX/MEM register 13 and the selector 17.

The selector 17 selects the sum delivered from the second adder 16 if a selection signal 25 is supplied from the ID/EX register 12, whereby the PC register 18 updates the program count by the branch address.

Figure 4:
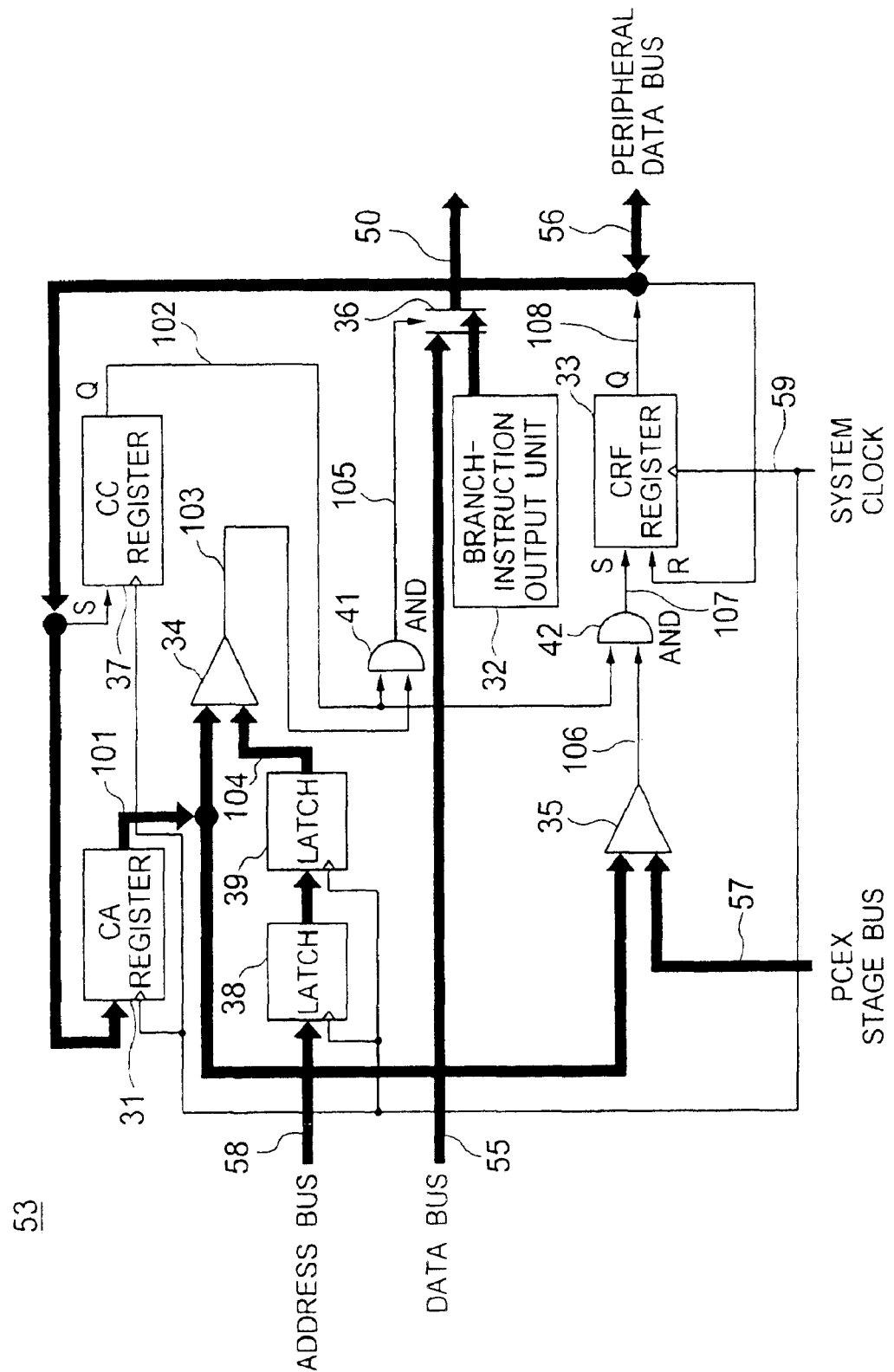
FIG. 4 is a configuration of an example of the ROM correction unit shown in FIG. 2 according to a first embodiment of the present invention.

Referring to FIG. 4, the ROM correction unit 53 according to a first embodiment of the present invention includes a CA register 31 for storing the subject address, a branch-instruction output unit 32, a CRF register 33 for setting a ROM correction flag, comparators 34 and 35, a selector 36, a CC register 37 for generating a control signal for controlling the operation of the ROM correction function, latches 38 and 39, and AND gates 41 and 42.

The CA register 31 has an input connected to the peripheral data bus 56 and delivers the subject address 101 to the first inputs of the comparators 34 and 35. The CC register 37 has an input connected to the peripheral data bus 56, and delivers a control signal 102 to the first inputs of the AND gates 41 and 42. The latch 38 has an input connected to the address bus 58, and an output connected to the input of the latch 39. The latch 39 delivers the current address 104 to the second input of the comparator 34. The comparator 34 delivers a coincidence signal 103 to the second input of the AND gate 41, which delivers a selection signal 105 to the selector 36.

The selector 36 has a first input connected to the data bus 55. The branch-instruction output unit 32 delivers a branch instruction "JMP" to a second input of the selector 36. The comparator 35 has a second input connected to the PCEX stage bus 57, and delivers a coincidence signal 106 thereof to a second input of the AND gate 42. The AND gate 42 delivers the output thereof, or exchange signal 107, to a set input of the CRF register 33. The CRF register 33 has a reset input connected to the peripheral data bus 56, and set a correction flag 108 and delivers the same through the peripheral data bus 56.

The selector 36 selects the current instruction delivered from the ROM 52 if the selection signal 105 assumes a low level, and selects the branch instruction "JMP" delivered from the branch-instruction output unit 32 if the selection signal 105 assumes a high level, to output the selected instruction through the data bus 50.

Figure 5:
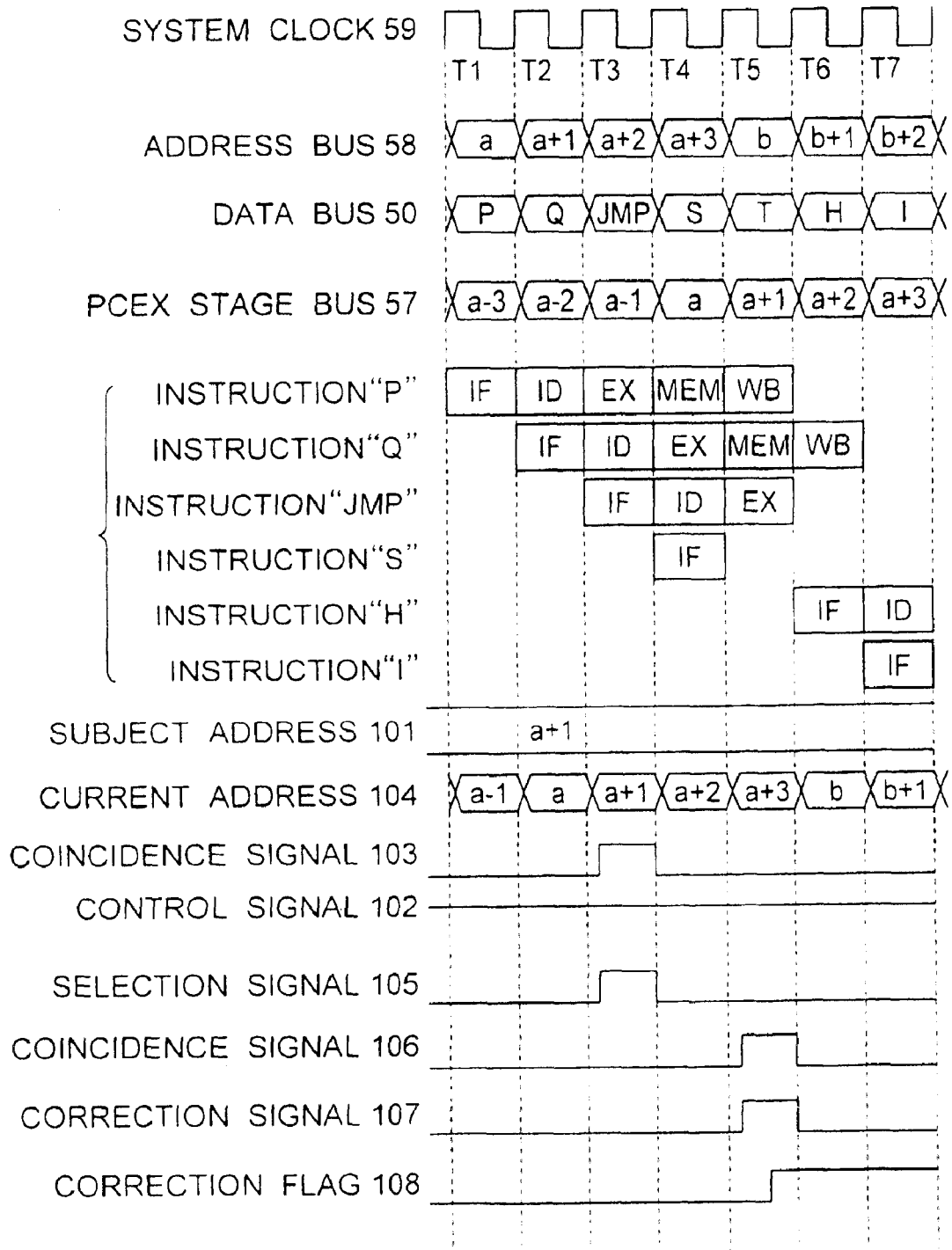
FIG. 5 is the flowchart of the computer system of FIG. 2.

Referring to FIG. 5, there is shown a timing chart for showing exemplified operations of the computer system of the present embodiment. Before operation of the computer system, the CPU 51 stores a subject address signal 101 indicating address "a+1" of the original instruction group, which should be replaced by a modified instruction group, in the CA register 31 through the peripheral bus 56. The CPU 51 also sets the CC register 37 to output a high level of the control signal 102, and resets the CRF register 33 to output a low level of the correction flag 108.

FIG. 6 shows an exemplified configuration of the program stored in the ROM 52, wherein instructions "P", "Q", "R", "S", "T", "U", ..., "Z", ... are stored in the addresses starting from address "a+1". The original instruction group having a bug therein includes instructions "R", "S", "T", "U" ..., which are stored in address "a+1" to "a+9". Address "a+1" of instruction "Z" is specified as a return address because the original instruction group having the bug ends at address "a+9". All the instructions depicted herein are ordinary instructions and do not include a branch instruction, which indicates "jumping" to another address outside the ROM 52. In this configuration, address "a+1" is the subject address, as described above, to which the ROM correction function is to be applied.

FIG. 7 shows an exemplified configuration of the modified instruction group stored in the RAM. The modified instruction group includes instructions "H", "I", "J", "K", ..., "M" stored in the addresses starting from address "b" and ending at address "b+5". These addresses are ordinary instructions and do not include a branch instruction except for instruction "M", which indicates "jumping" to address "a+10".

FIG. 7 shows a time table illustrating addresses of the instructions calculated for pipe-line processing along with time periods Tn specified by a sequential number of clock pulses in the system clock.

Back to FIG. 5, at time period "T1", the address bus 58, the data bus 50 and the PCEX stage bus 57 deliver addresses "a", instruction code of "P", address "a−3", respectively, and the current address is "a−1". The CPU 51 processes instruction "P" on the IF stage at period "T1". Then, the CPU 51 operates for pipe-line processing of these instructions on respective stages. At period "T2", instruction "P" enters the ID stage, whereas instruction "Q" enters the IF stage.

At period "T3", the coincidence signal 103 obtained by comparison of the current address 104 against the subject address 103 assumes a high level, whereby the selection signal 105 obtained as a product of the coincidence signal 103 and the control signal 102 assumes a high level. In the ROM correction unit 53, the selector 36 delivers a branch instruction "JMP", supplied from the branch-instruction output unit 32, to the data bus 50. Instruction "P" enters the EX stage, instruction "Q" enters the ID stage, and the branch instruction "JMP" enters the IF stage.

At period "T4", instruction "S" enters the IF stage, whereas each of the other instructions advances by one stage.

At period "T5", the coincidence signal 106 obtained by comparison of the address on the PCEX stage bus 57 against the subject address 101 assumes a high level, whereby the correction signal 107 obtained as a product of the coincidence signal 106 and the control signal assumes a high level. The CRF register 33 is set by the correction signal 107 to set the correction flag 108 to a high level. Instructions "P", "Q", "JMP" respectively advance by one stage. Execution of "JMP" on the EX stage changes the address on the address bus 58 to address "b" of instruction "H" in the modified instruction group, whereby the current address enters the modified instruction group.

At period "T6", instructions "Q" and "H" advance to the WB stage and IF stage, respectively, and at period "T7", instruction "H" advances to the ID stage and instruction "I" enters the IF stage. After the processing by the CPU 51 advances instruction "M" indicating "return to address "a+10" onto the EX stage, instruction "Z" enters the IF stage and advances to subsequent stages clock by clock. Thus, the program returns to the program bypassing the original program group having the bug.

In FIG. 8, it is shown that the addend 24 fed to the second adder 16 assumes "0" while successive instructions are read from the ROM, and assumes "b−a−1" at period T5 to output address "b" to the address bus 58 for jumping from the current address to the branch address "b".

Figure 9:
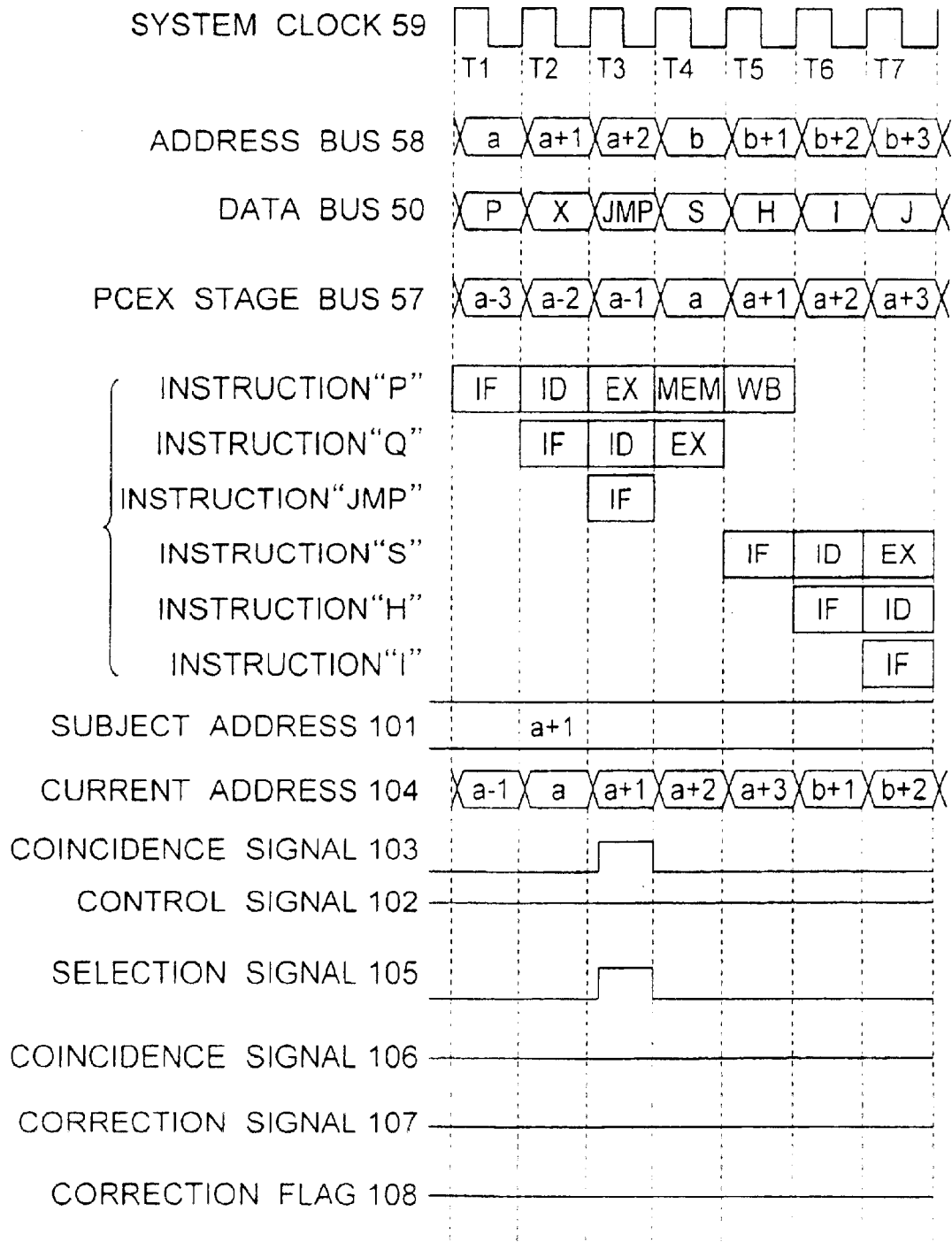
FIG. 9 is another portion of the flowchart of the computer system of FIG. 2.

Referring to FIG. 9, there is shown another portion of the timing chart in the computer system of FIG. 2, wherein an ordinary branch instruction "X" is stored in address "a" of the ROM area and thus the ROM correction unit is not used for exchange of the instruction group. FIG. 10 shows the instruction group having therein a branch instruction shown in FIG. 9, and FIG. 11 is a modified instruction group to be jumped from the instruction "X" of FIG. 10. This case may occur when the instruction group stored in the ROM area is frequently replaced by a variety of modified instruction groups, which depend on the data obtained in the processing itself and are expected before the design of the ROM.

In FIG. 10, instruction "X" stored in address "a" is an ordinary branch instruction indicating "JMP" to address "b" of the modified instruction group, the procedure of which does not use the ROM correction unit 53. In FIG. 11, the modified instruction group has a top address "b" and an end address "b+5" which indicates a branch instruction indicating "JMP" to address "a+10" of the ROM area.

Referring to FIG. 12, there is shown the procedure of calculation of the addresses similarly to FIG. 8. At period T4, as shown in FIG. 9, instructions "P" and "X" enter the MEM stage and the EX stage, respectively. The CPU 51 executes instruction "X" to thereby update the current address by address "b" and deliver address "b" through the address bus 58, and executes the modified instructions in the RAM area.

The CPU 51 executes instruction "M" to return to address "a+10" of the ROM area, whereby the CPU 51 consecutively executes the instructions starting from address "a+10" in the ROM area. In this configuration, the branch instruction "JMP" replacing the current address not based on the ROM correction function is executed, wherein the correction flag maintains a low level.

In the timing chart of FIG. 9, the CPU 51 recognizes that the branch instruction "JMP" replacing the original instruction group does not use the ROM correction function, by monitoring the correction flag 108 of the CRF register through the peripheral data bus 56. Thus, the calculation of the program count can be conducted correctly.

Figure 13:
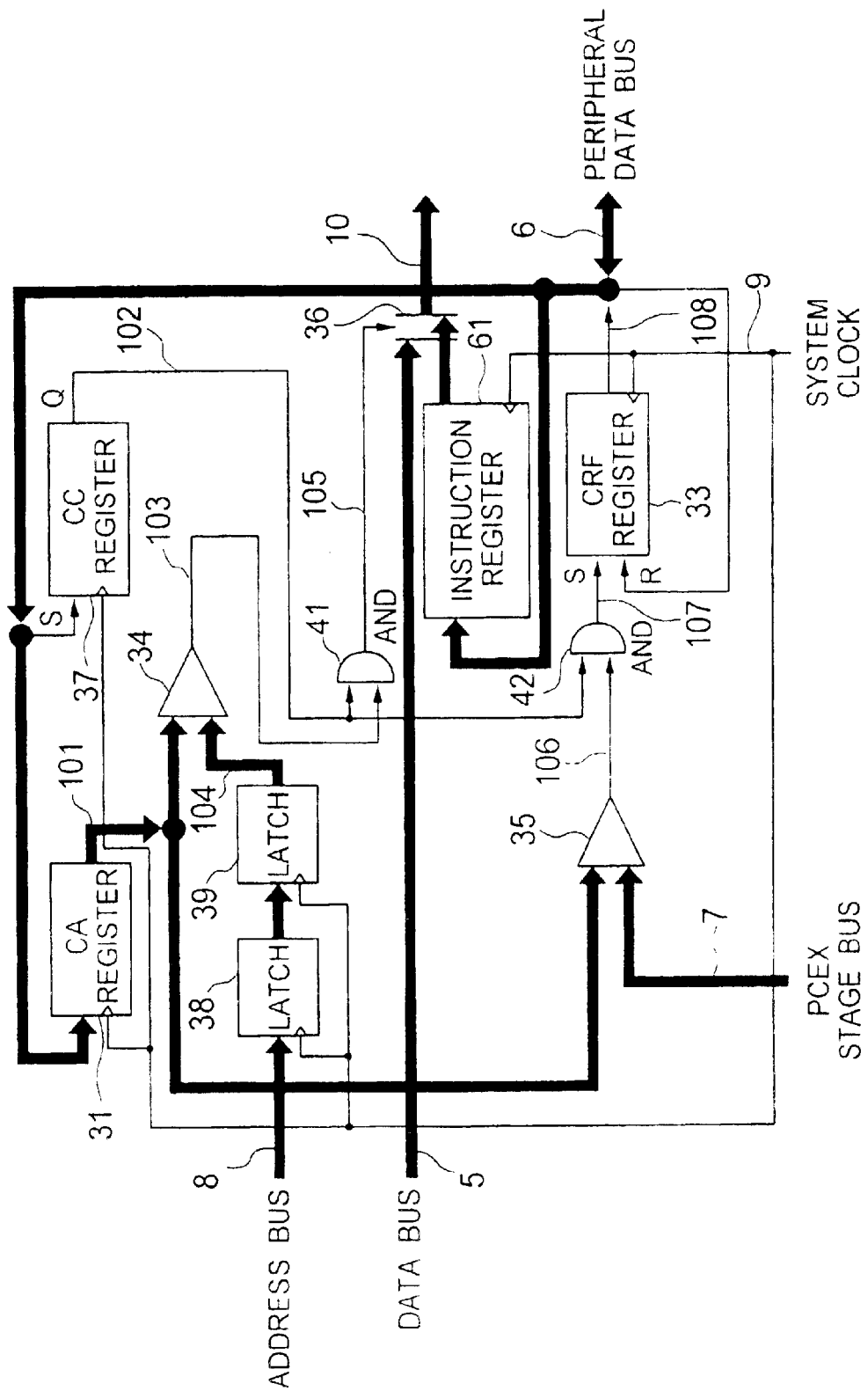
FIG. 13 is a configuration of an example of the ROM correction unit shown in FIG. 2 according to a second embodiment of the present invention.

Referring to FIG. 13, a ROM correction unit according to a second embodiment of the present invention is similar to the first embodiment except for the configuration wherein the original instruction can be arbitrarily selected.

More specifically, the ROM correction unit 53A of the present embodiment includes, in addition to the configuration of FIG. 4, an instruction register 61 for storing a modified instruction to replace the original instruction having a bug therein. The instruction register 61 has an input connected to the peripheral data bus 56, and an output connected to the second input of the selector 46.

The CPU 51 stores a modified instruction in the instruction register 61 to be used for replacing the original instruction by using the ROM correction function. In the present embodiment, a single instruction is replaced by the modified instruction stored in the instruction register 61.

In the present embodiment, if a single original instruction has a bug therein, the original instruction can be replaced by the modified instruction using the ROM correction function without processing for a branch instruction and a return instruction.

In the embodiments of the present invention, the ROM correction unit sets a flag which indicates whether or not the branch instruction is executed. Thus, when a plurality of subject addresses are designated for the ROM correction function in a single computer system, the CPU can recognize the correct order of the subject addresses.

Since the above embodiments are described only for examples, the present invention is not limited to the above embodiments and various modifications or alterations can be easily made therefrom by those skilled in the art without departing from the scope of the present invention.

What is claimed is:

1. A computer system comprising a CPU for operating with pipe-line processing, a ROM storing a program to be executed by said CPU, and a plurality of ROM correction units each including a first storage unit for storing a subject address of an original instruction group in the program having a bug therein, a second storage unit for storing a modified instruction group for replacing the original instruction group by the modified instruction group having a branch address, a comparator for comparing a current address of a current instruction read from said ROM against the subject address, a selector for selecting the current address or the branch address based on a result of the comparison by said comparator, and a flag generator for setting a ROM correction flag when said selector selects the branch address, one of said ROM correction units delivering said ROM correction flag through a data bus.

2. The computer system as defined in claim 1, wherein said flag is set at an execution stage of a branch instruction indicating the current address to jump to said branch address.

3. The computer system as defined in claim 1, wherein the modified instruction group is supplied from outside the computer system.

* * * * *